(12) United States Patent
Chen et al.

(10) Patent No.: US 12,327,437 B2
(45) Date of Patent: Jun. 10, 2025

(54) AUTOMOBILE DIAGNOSIS DEVICE, SYSTEM AND METHOD

(71) Applicant: AUTEL INTELLIGENT TECHNOLOGY CORP., LTD., Guangdong (CN)

(72) Inventors: Huaming Chen, Guangdong (CN); Haibo Pang, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 378 days.

(21) Appl. No.: 17/660,247

(22) Filed: Apr. 22, 2022

(65) Prior Publication Data

US 2022/0245972 A1 Aug. 4, 2022

Related U.S. Application Data

(63) Continuation of application No. PCT/CN2020/125872, filed on Nov. 2, 2020.

(30) Foreign Application Priority Data

Nov. 6, 2019 (CN) .......................... 201911076893.7

(51) Int. Cl.
*G07C 5/00* (2006.01)
*B60R 16/023* (2006.01)
(Continued)

(52) U.S. Cl.
CPC .......... *G07C 5/008* (2013.01); *B60R 16/0231* (2013.01); *G07C 5/0808* (2013.01);
(Continued)

(58) Field of Classification Search
CPC .. G07C 5/008; G07C 5/0808; B60R 16/0231; H04L 12/40; H04L 2012/40215;
(Continued)

(56) References Cited

U.S. PATENT DOCUMENTS

| 5,214,582 A | 5/1993 | Gray |
| 9,275,503 B2 | 3/2016 | Chen et al. |

(Continued)

FOREIGN PATENT DOCUMENTS

| AT | 510379 A2 | 3/2012 |
| CN | 201707601 U | 1/2011 |

(Continued)

OTHER PUBLICATIONS

EPO machine translated description of CN 103676936 A. (Year: 2014).*

(Continued)

*Primary Examiner* — Navid Z. Mehdizadeh
*Assistant Examiner* — Shelley Marie Osterhout
(74) *Attorney, Agent, or Firm* — Andrew C. Cheng

(57) ABSTRACT

Disclosed are an automobile diagnosis device, system and method. The automobile diagnosis device includes: an automatic diagnosis circuit for acquiring vehicle identification information of an automobile to be diagnosed; a standard communication bus circuit electrically connected to the automatic diagnosis circuit; several diagnostic communication bus circuits including at least one of a 24V CAN bus circuit, an FDCAN bus circuit, a PLC bus circuit and a DoIP bus circuit; a communication module; and a controller. The controller is electrically connected to the automatic diagnosis circuit, the standard communication bus circuit, each diagnostic communication bus circuit and the communication module respectively. The controller is configured to select a target communication bus circuit according to the vehicle identification information and communicate with the automobile to be diagnosed.

16 Claims, 7 Drawing Sheets

(51) Int. Cl.
*G07C 5/08* (2006.01)
*H04L 12/40* (2006.01)

(52) U.S. Cl.
CPC .... *H04L 12/40* (2013.01); *H04L 2012/40215* (2013.01); *H04L 2012/40273* (2013.01)

(58) Field of Classification Search
CPC . H04L 2012/40273; H04L 2012/40208; H04L 12/40189; H04L 67/12; G05B 23/0262; G05B 2219/24065; G05B 23/0213
See application file for complete search history.

(56) References Cited

U.S. PATENT DOCUMENTS

| | | | |
|---|---|---|---|
| 9,305,408 | B2 | 4/2016 | Kwon et al. |
| 10,055,901 | B2 | 8/2018 | Chen et al. |
| 2009/0276115 | A1 | 11/2009 | Chen |
| 2013/0282227 | A1 | 10/2013 | Chen et al. |
| 2014/0365067 | A1 | 12/2014 | Krishnakumar et al. |
| 2015/0094903 | A1* | 4/2015 | Bell .................. G07C 5/0808 701/1 |
| 2016/0180608 | A1 | 6/2016 | Chen et al. |
| 2018/0342115 | A1 | 11/2018 | Chen et al. |
| 2019/0081817 | A1* | 3/2019 | Sasaki .................. H04L 12/46 |
| 2020/0244478 | A1* | 7/2020 | Dieckmann .............. B60D 1/36 |

FOREIGN PATENT DOCUMENTS

| | | | |
|---|---|---|---|
| CN | 102098326 | A | 6/2011 |
| CN | 201882056 | U | 6/2011 |
| CN | 103676936 | A * | 3/2014 |
| CN | 104090565 | A | 10/2014 |
| CN | 104298231 | A | 1/2015 |
| CN | 105223944 | A | 1/2016 |
| CN | 107948036 | A | 4/2018 |
| CN | 108255158 | A | 7/2018 |
| CN | 110716535 | A | 1/2020 |
| CN | 210895123 | U | 6/2020 |
| KR | 20140143504 | A | 12/2014 |
| KR | 101491260 | B1 | 2/2015 |
| WO | 2019141114 | A1 | 7/2019 |

OTHER PUBLICATIONS

International search report mailed Jan. 27, 2021 PCT/CN2020/125872.

Extended European search report dated Oct. 21, 2022; Appln. No. 20885347.3.

The office action of CN patent application No. 201911076893.7 issued on Aug. 29, 2024.

The search report of CN patent application No. 201911076893.7 issued on Aug. 29, 2024.

* cited by examiner

AUTOMOBILE DIAGNOSIS DEVICE, SYSTEM AND METHOD

CROSS-REFERENCE TO RELATED APPLICATIONS

The present application is continuation application of International Application No. PCT/CN2020/125872, filed on Nov. 2, 2020, which claims priority to the Chinese patent application No. 201911076893.7, filed on Nov. 6, 2019, the entire contents of which are incorporated herein by reference.

TECHNICAL FIELD

The present application relates to the technical field of automobile diagnosis, and more particularly to an automobile diagnosis device, system and method.

BACKGROUND

With the continuous development of automobile diagnostic technology, the integrated communication protocol of automobile diagnosis devices is constantly enriched. However, if the automobile type of the automobile to be diagnosed does not support one or more communication protocols in automobile diagnosis device, the automobile cannot be diagnosed. Therefore, the automobile diagnosis device cannot support the automobile diagnosis of different automobile types, reducing the universality of the diagnosis.

SUMMARY

Embodiments of the present application aim to provide an automobile diagnosis device, system, and method which are capable of supporting automobile diagnosis for different automobile types, thereby improving the universality of automobile diagnosis devices.

In order to solve the above technical problem, embodiments of the present application provide the following technical solutions.

In the first aspect, an embodiment of the present application provides an automobile diagnosis device, comprising:

an automatic diagnosis circuit configured to acquire vehicle identification information of an automobile to be diagnosed;

a standard communication bus circuit electrically connected to the automatic diagnosis circuit;

several diagnostic communication bus circuits comprising at least one of a 24V CAN bus circuit, an FDCAN bus circuit, a PLC bus circuit, and a DoIP bus circuit, the several diagnostic communication bus circuits supporting communication protocols of several kinds of different automobile types;

a communication module; and a controller electrically connected to the automatic diagnosis circuit, the standard communication bus circuit, each of the several diagnostic communication bus circuits and the communication module respectively, the controller configured to select a target communication bus circuit according to the vehicle identification information, communicate with the automobile to be diagnosed via the target communication bus circuit so as to acquire diagnostic data of the automobile to be diagnosed, and send the diagnostic data to a host computer via the communication module, wherein the target communication bus circuit comprises one diagnostic communication bus circuit or the standard communication bus circuit.

The 24V CAN bus circuit is electrically connected to the controller.

The 24V CAN bus circuit comprises:

a CAN receiving circuit electrically connected to the controller, and configured to receive data sent by the controller according to vehicle identification information and outputting a differential signal; and a CAN transmission circuit electrically connected to the CAN receiving circuit and the controller respectively, and configured to enable the controller to communicate with the automobile to be diagnosed according to the differential signal, and forwarding the diagnostic data to the controller.

The CAN receiving circuit comprises:

a first buffer circuit electrically connected to the controller, and configured to buffer the vehicle identification information;

a first level conversion circuit electrically connected to the first buffer circuit, and configured to convert buffered vehicle identification information into a first level signal;

a second buffer circuit electrically connected to the first buffer circuit, and configured to secondly buffer the vehicle identification information; and a second level conversion circuit electrically connected to the second buffer circuit for converting the vehicle identification information after secondary buffering into a second level signal, wherein the first level signal and the second level signal constitute the differential signal and are output to the CAN transmission circuit.

The FDCAN bus circuit is electrically connected to the controller.

The PLC bus circuit is electrically connected to the controller.

The DoIP bus circuit is electrically connected to the controller.

The DoIP bus circuit comprises:

an Ethernet hub respectively electrically connected to the controller and the communication module; and a network transformer electrically connected to the Ethernet hub, and configured to transform the diagnostic data and then send the and configured to the Ethernet hub.

The DoIP bus circuit further comprises an RJ45 network port electrically connected to the Ethernet hub.

The communication module comprises:

several kinds of communication interface circuits configured to communicate with the host computer;

a communication chip electrically connected to each of the communication interface circuits; and a signal converting unit electrically connected to the controller and the communication chip respectively, the signal converting unit configured to convert the diagnostic data into communication data corresponding to the communication interface circuit so that the communication chip selects a corresponding communication interface circuit and sends the communication data to the host computer.

The several kinds of communication interface circuits comprise a USB interface circuit, a WIFI interface circuit, and a Bluetooth interface circuit.

The signal converting unit comprises:

a USB hub electrically connected to the controller, and configured to forward the diagnostic data; and a USB changeover switch electrically connected to the USB hub, the communication chip, and the USB interface circuit respectively, wherein when the controller controls the USB changeover switch to work in a first switch state, the diagnostic data forwarded by the USB hub is transmitted to the communication chip via the USB changeover switch; when the controller controls the USB changeover switch to work in a second switch state, the diagnostic data forwarded by the USB hub is transmitted to the USB interface circuit via the USB changeover switch.

In the second aspect, an embodiment of the present application also provides an automobile diagnosis system, comprising:

the automobile diagnosis device according to the above-described; and a host computer communicatively connected to the automobile diagnosis device for displaying diagnostic data sent by the automobile diagnosis device.

In the third aspect, an embodiment of the present application also provides an automobile diagnosis method applied to the automobile diagnosis device as described above, the method comprising:

acquiring vehicle identification information;

selecting a target communication bus circuit according to the vehicle identification information;

communicating with an automobile to be diagnosed through the target communication bus circuit such that the automobile to be diagnosed returns diagnostic data based on the target communication bus circuit; and receiving the diagnostic data.

Beneficial effects of the present application are as follows: embodiments of the present application provide an automobile diagnosis device, system, and method, which acquires vehicle identification information of an automobile to be diagnosed through the automatic diagnosis circuit. The controller selects a target communication bus circuit according to the vehicle identification information and communicates with the automobile to be diagnosed through the target communication bus circuit so as to acquire diagnostic data of the automobile to be diagnosed. The target communication bus circuit includes one diagnostic communication bus circuit or a standard communication bus circuit, and several diagnostic communication bus circuits include a 24V CAN bus circuit, an FDCAN bus circuit, a PLC bus circuit, at least one of the DoIP bus circuits, supporting several kinds of communication protocols of different automobile types. Therefore, the embodiment of the present application determines a communication protocol supported by an automobile to be diagnosed through vehicle identification information of the automobile to be diagnosed, and selects a corresponding target communication bus circuit according to the communication protocol such that the automobile diagnosis device supports automobile diagnosis of different automobile types, thereby improving the universality of the automobile diagnosis device.

BRIEF DESCRIPTION OF THE DRAWINGS

One or more embodiments are exemplified by the accompanying drawings corresponding thereto. These exemplified descriptions do not constitute a limitation on the embodiments. Elements in the drawings having the same reference number designations are illustrated as similar elements, and unless otherwise particularly stated, the drawings do not constitute a proportional limitation.

DESCRIPTION OF EMBODIMENTS

In order to facilitate the understanding of the present application, a more detailed description of the present application will be rendered below by reference to the accompanying drawings and preferred embodiments. It needs to be noted that when one element is referred to as being "connected" to another element, it can be directly connected to the other element or one or more intervening elements may be provided in between. Furthermore, the terms "first", "second", and the like are used for descriptive purposes only and are not to be construed as indicating or implying relative importance.

Unless defined otherwise, all technical and scientific terms used herein have the same meaning as commonly understood by one of ordinary skill in the art to which the present application belongs. The terms used in the description of the present application are for the purpose of describing particularly preferred embodiments only and are not intended to be limiting of the present application. As used herein, the term "and/or" includes any and all combinations of one or more of the associated listed items.

Furthermore, the technical features involved in different embodiments of the present application described below can be combined with each other as long as they do not conflict with each other.

Figure 1:
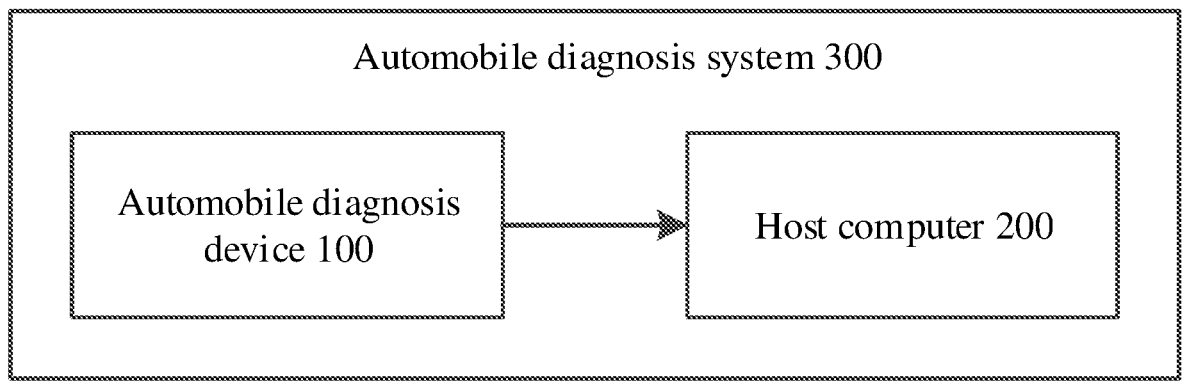
FIG. 1 is a schematic view showing a structure of an automobile diagnosis system provided by an embodiment of the present application.

Referring to FIG. 1, a schematic view showing a structure of an automobile diagnosis system provided by an embodiment of the present application is shown. As shown in FIG. 1, an automobile diagnosis system 300 includes an automobile diagnosis device 100 and a host computer 200 communicatively connected to the automobile diagnosis device 100. The automobile diagnosis device 100 is connected to an automobile to be diagnosed (not shown in FIG. 1) for acquiring diagnostic data of the automobile to be diagnosed and sending the same to the host computer 200. The host computer 200 is configured to display the diagnostic data sent by the automobile diagnosis device 100.

In the embodiment of the present application, the automobile diagnosis system 300 can support automobile diagnosis of different automobile types by employing the automobile diagnosis device 100 disclosed in any one of the following embodiments, thereby improving the universality of automobile diagnosis. Technical details not described in detail in the embodiment can be found in the following embodiment.

Figure 2:
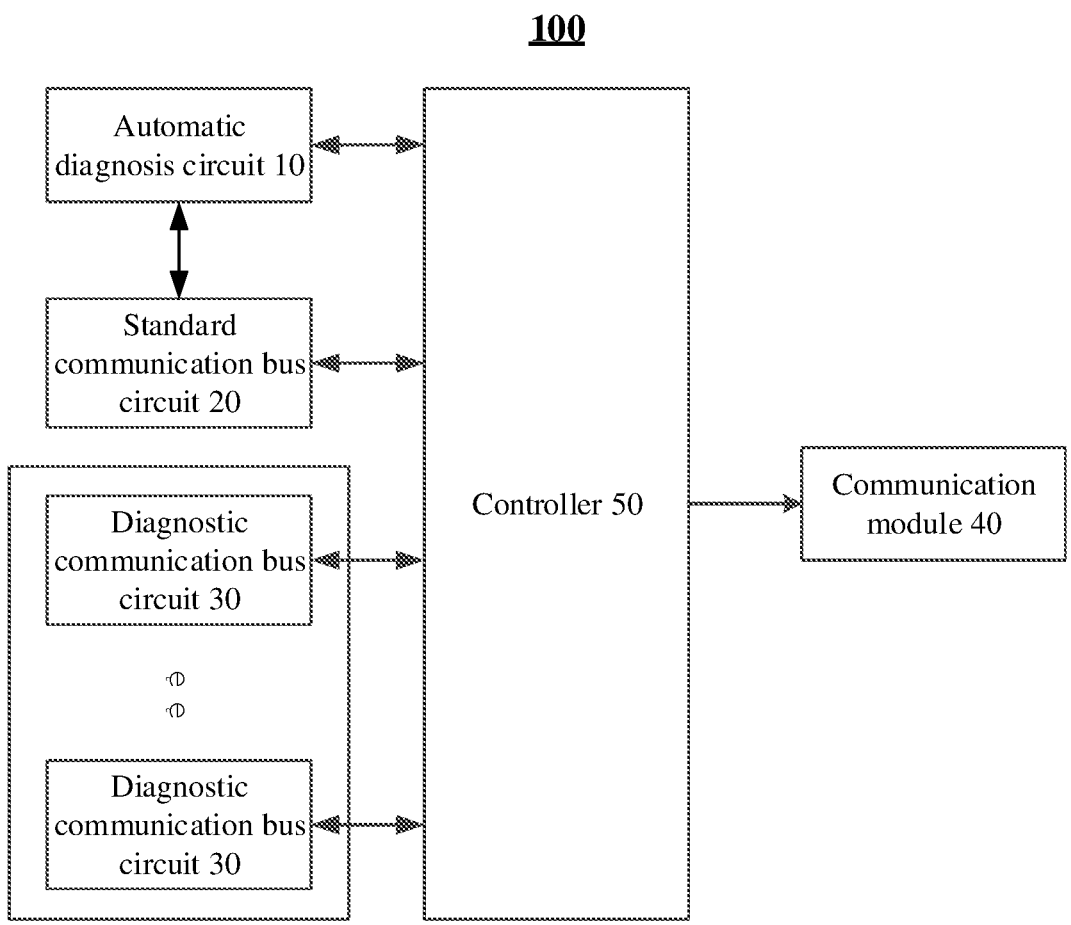
FIG. 2 is a schematic view showing a first structure of the automobile diagnosis device provided by an embodiment of the present application.

Referring to FIG. 2, a schematic view showing a first structure of the automobile diagnosis device 100 provided by an embodiment of the present application is shown. The automobile diagnosis device 100 includes an automatic diagnosis circuit 10, a standard communication bus circuit 20, several diagnostic communication bus circuits 30, a communication module 40, and a controller 50.

The automatic diagnosis circuit 10 is configured to acquire vehicle identification information of an automobile to be diagnosed.

In the present embodiment, the vehicle identification information includes vehicle type information, vehicle information, and communication protocol information. The vehicle type information comprises a small automobile, a commercial automobile, a heavy truck, a trailer bus, etc. The vehicle information includes vehicle brand information, the year of manufacture, historical maintenance information, traveled distance information, etc. The communication protocol information refers to a communication protocol supported by a tested circuit of the automobile to be diagnosed. It could be understood that one automobile to be diagnosed supports at least one kind of communication protocol. For example, communication protocols supported by a motor control system, an entertainment multimedia system, a vehicle body system, a power transmission system, and an ADAS automatic driving system of the automobile to be diagnosed may be different.

The automobile diagnosis device 100 includes a communication interface circuit (not shown in FIG. 2) communicatively connected with the automobile to be diagnosed. The communication interface circuit includes, for example, a DB26 connector. When the automobile diagnosis device 100 is normally used, the DB26 connector is communicatively connected with the automobile to be diagnosed, and the automatic diagnosis circuit 10 is electrically connected with the DB26 connector for acquiring vehicle identification information of the automobile to be diagnosed through the DB26 connector.

The standard communication bus circuit 20 is electrically connected to the automatic diagnosis circuit 10 and the controller 50, respectively.

In the present embodiment, the standard communication bus circuit 20 includes a CAN communication bus circuit which is a communication bus based on a 5V system and has a maximum transmission rate of 1 Mbps. The controller 50 performs controlling according to the vehicle identification information to send the diagnostic data acquired by the automatic diagnosis circuit 10 to the controller 50 through the CAN communication bus circuit.

It can be seen that the standard communication bus circuit 20 can only be applied to a 5V system and has a low transmission rate. For this reason, an embodiment of the present application adds several diagnostic communication bus circuits 30 on the basis of the standard communication bus circuit 20, and different diagnostic communication bus circuits 30 support communication protocols of different automobile types and are suitable for automobile diagnosis of different types of automobiles.

In some embodiments, the standard communication bus circuit 20 further comprises at least one of the common standard communication bus circuits such as a LIN communication bus circuit, a K-line circuit, a SWCAN communication bus circuit, an RS485 communication bus circuit, and a VPW+PWM communication bus circuit, etc. Namely, diagnostic data in a format corresponding to a communication protocol supported by the LIN communication bus circuit, the K-line circuit, the SWCAN communication bus circuit, the RS485 communication bus circuit or the VPW+PWM communication bus all pass through the automatic diagnosis circuit 10, the standard communication bus circuit 20, and finally reach the controller 50. If the diagnostic data is not communicated and transmitted via a communication protocol supported by the LIN communication bus circuit, the K-line circuit, the SWCAN communication bus circuit, the RS485 communication bus circuit or the VPW+PWM communication bus, the automobile diagnosis device 100 cannot diagnose the automobile to be diagnosed.

Each diagnostic communication bus circuit 30 is respectively connected to the controller 50. The several diagnostic communication bus circuits 30 support communication protocols for several different automobile types.

Figure 3:
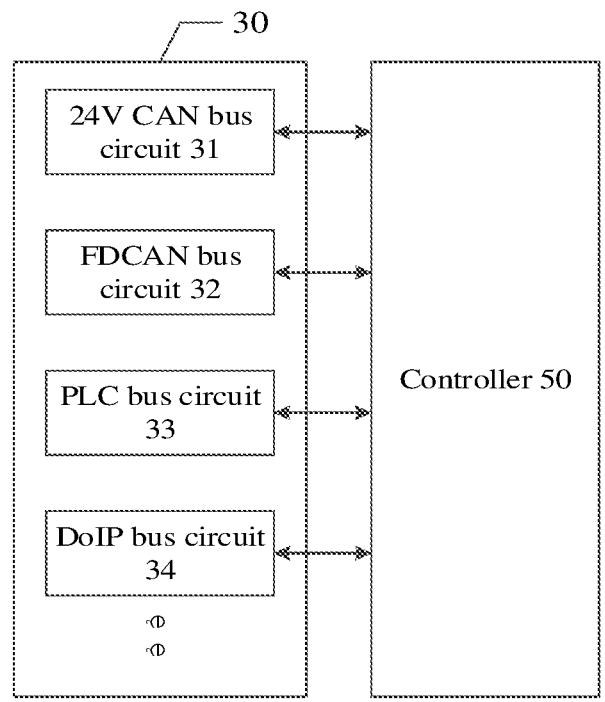
FIG. 3 is a schematic view showing the structure of a communication bus circuit provided by an embodiment of the present application.

Referring to FIG. 3, the several diagnostic communication bus circuits 30 include at least one of a 24V CAN bus circuit 31, an FDCAN bus circuit 32, a PLC bus circuit 33, and a DoIP bus circuit 34.

The 24V CAN bus circuit 31 is electrically connected to the controller 50. The 24V CAN bus circuit 31 is a CAN (Controller Area Network) communication bus circuit based on a 24V system, and is mainly used for CAN bus communication of a heavy truck.

Figure 4:
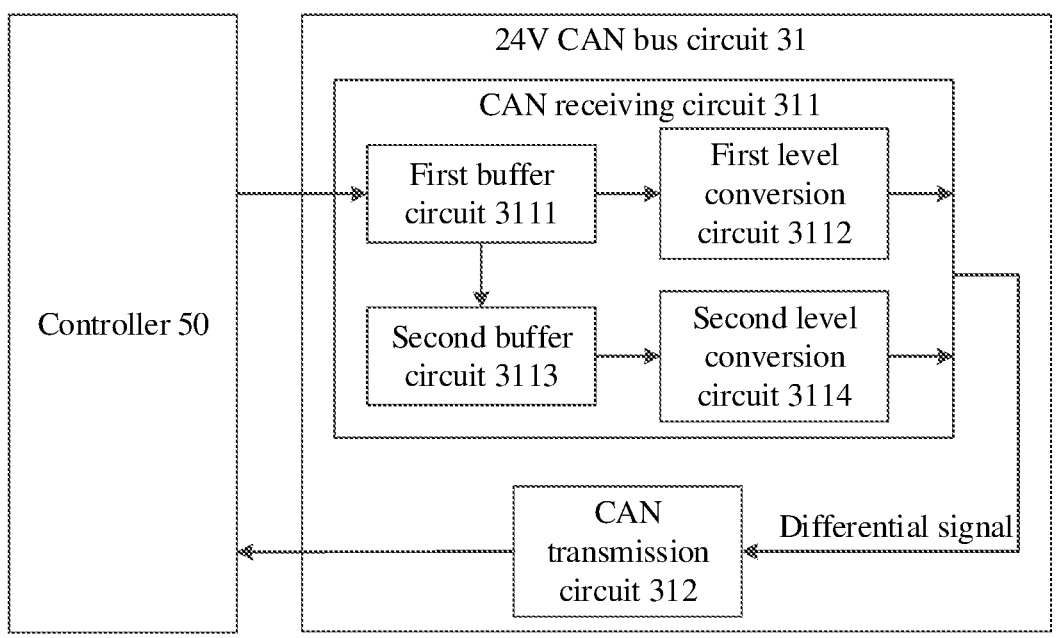
FIG. 4 is a schematic view showing the structure of a 24V CAN bus circuit provided by an embodiment of the present application.

Referring to FIG. 4, the 24V CAN bus circuit 31 includes a CAN receiving circuit 311 and a CAN transmission circuit 312.

The CAN receiving circuit 311 is electrically connected to the controller 50 for receiving data sent by the controller 50 according to the vehicle identification information and outputting a differential signal.

The CAN receiving circuit 311 includes a first buffer circuit 3111, a first level conversion circuit 3112, a second buffer circuit 3113, and a second level conversion circuit 3114.

The first buffer circuit 3111 is electrically connected to the controller 50, and is configured to buffer the vehicle identification information. The first level conversion circuit 3112 is electrically connected to the first buffer circuit 3111, and is configured to convert the buffered vehicle identification information into a first level signal. The second buffer circuit 3113 is electrically connected to the first buffer circuit 3111, and is configured to buffer the vehicle identification information for a second time. The second level conversion circuit 3114 is electrically connected to the second buffer circuit 3113, and is configured to convert the vehicle identification information after secondary buffering into a second level signal. The first level signal and the second level signal constitute the differential signal and are output to the CAN transmission circuit 312.

In the present embodiment, the first level signal is a high level signal and the second level signal is a low level signal.

The CAN transmission circuit 312 is electrically connected to the CAN receiving circuit 311 and the controller 50 respectively, and is configured to enable the controller 50 to communicate with the automobile to be diagnosed according to the differential signal, and forward the diagnostic data to the controller 50.

When the controller 50 detects that the communication protocol supported by the automobile to be diagnosed needs to communicate via the 24V CAN signal according to the vehicle identification information, it is selected to switch to the 24V CAN bus circuit 31; the CAN receiving circuit 311 receives data sent by the controller 50 according to the vehicle identification information and outputs a differential signal; the CAN transmission circuit 312 sends the 24V CAN signal of the automobile to be diagnosed to the controller 50 via the transceiver of the 24V CAN bus circuit 31 according to the differential signal, thereby realizing the communication between the controller 50 with the automobile to be diagnosed, which avoids the problem of the automobile diagnosis device 100 not being able to diagnose the automobile to be diagnosed due to the standard communication bus circuit 20 not supporting 24V CAN signal for communication.

The FDCAN bus circuit 32 is electrically connected to the controller 50.

The FDCAN (CAN with Flexible Data rate, high-speed CAN) bus circuit 22 inherits the main characteristics of the CAN bus, and the CAN bus uses a two-wire serial communication protocol. By being based on non-destructive arbitration technology, distributed real-time control, reliable error handling and detection mechanism, the CAN bus has high security, but the bandwidth and data field length of the CAN bus are restricted. CAN FD bus makes up for the bandwidth and data field length restriction of the CAN bus. Therefore, the FDCAN bus circuit 32 has higher bandwidth and data throughput with a maximum transmission rate of 8 Mbps.

When the controller 50 detects that the communication protocol supported by the automobile to be diagnosed needs to communicate via an FDCAN signal according to the vehicle identification information, it is selected to switch to the FDCAN bus circuit 32 to send the FDCAN signal of the automobile to be diagnosed to the controller 50 via a transceiver of the FDCAN bus circuit 32, thereby realizing data interaction between the controller 50 and the automobile to be diagnosed. Compared with the standard communication bus circuit 20, the FDCAN bus circuit 32 is suitable for automobile diagnosis of an automobile supporting the FDCAN signal for communication.

The PLC bus circuit 33 is electrically connected to the controller 50. The PLC bus circuit 33 is based on a serial data communication bus on an automobile power line.

When the controller 50 detects that the communication protocol supported by the automobile to be diagnosed needs to communicate via PLC according to the vehicle identification information, it is selected to switch to the PLC bus circuit 33 to send the PLC signal of the automobile to be diagnosed to the controller 50 via the transceiver of the PLC bus circuit 33, thereby realizing data interaction between the controller 50 and the automobile to be diagnosed. Compared with the standard communication bus circuit 20, the PLC bus circuit 33 is suitable for automobile diagnosis of an automobile supporting the PLC signal for communication.

The DoIP bus circuit 34 is electrically connected to the controller 50. The DoIP (Diagnostic over internet protocol, Ethernet-based diagnosis) bus circuit 24 can realize a remote diagnosis function.

Figure 5:
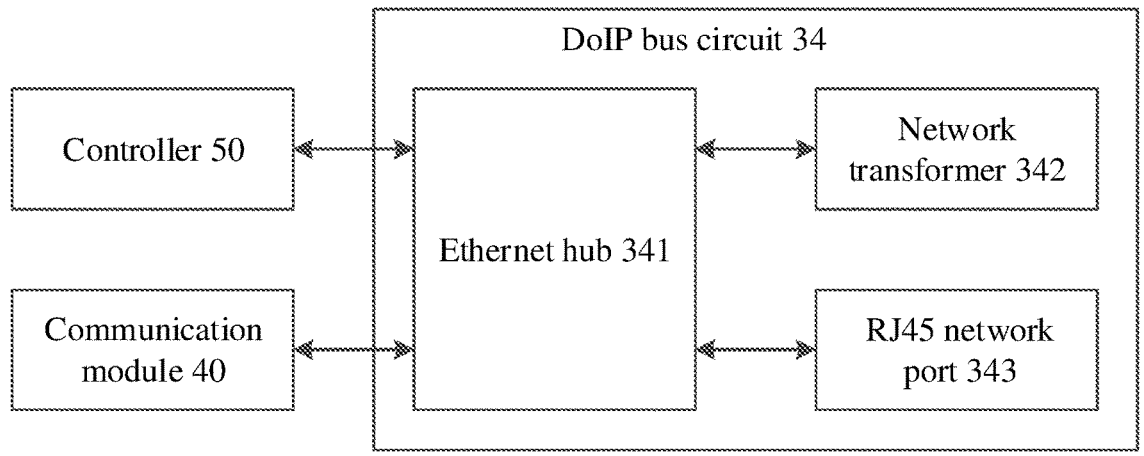
FIG. 5 is a schematic view showing the structure of a DoIP bus circuit provided by an embodiment of the present application.

Referring to FIG. 5, the DoIP bus circuit 34 includes an Ethernet hub 341, a network transformer 342, and an RJ45 network port 343.

The Ethernet hub 341 is electrically connected to the controller 50 and the communication module 40, respectively.

The network transformer 342 is electrically connected to the Ethernet hub 341, and is configured to transform the diagnostic data and transmit the transformed diagnostic data to the Ethernet hub 341.

The RJ45 network port 343 is electrically connected to the Ethernet hub 341.

The network transformer 342 is also electrically connected to the DB26 connector. the RJ45 network port 343 is also communicatively connected to a terminal device, and is configured to receive terminal data uploaded by the terminal device and forward the terminal data to the controller 50 via the Ethernet hub 341 so as to realize the remote diagnosis of an automobile. For example, the terminal device A acquires the diagnostic data of the automobile B, and stores the same in the internal storage of the terminal device A; the terminal device A is communicatively connected to the automobile diagnosis device 100 via the RJ45 network port 343, and sends the diagnostic data of the automobile B to the Ethernet hub 341, and forwards the same to the controller 50 via the Ethernet hub 341 such that when the automobile diagnosis device 100 is remote from the automobile B, remote automobile diagnosis of the automobile B can also be realized, or the automobile diagnosis device 100 can visually display the historical diagnostic data of the automobile B via the host computer 200.

The automobile diagnosis device 100 provided by an embodiment of the present application adds the 24V CAN bus circuit 31, the FDCAN bus circuit 32, the PLC bus circuit 33, and the DoIP bus circuit 34 on the basis of the standard communication bus circuit 20 so as to realize a more fully functional automobile diagnosis, which can support an automobile type thoroughly covering a small automobile, a commercial vehicle, a heavy truck, a trailer bus, etc., thereby avoiding the problem of communication protocol not being supported due to different automobile types, and improving the universality of the automobile diagnosis device 100.

The communication module 40 is electrically connected to the controller 50, and the communication module 40 is also communicatively connected to the host computer 200 for forwarding the diagnostic data to the host computer 200.

Figure 6:
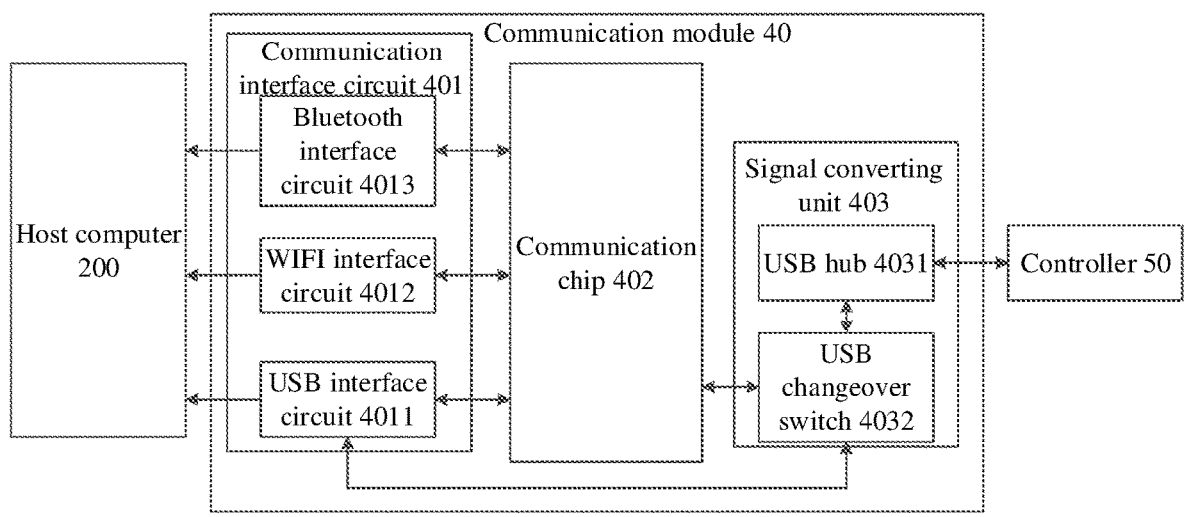
FIG. 6 is a schematic view showing the structure of a communication module provided by an embodiment of the present application.

Referring to FIG. 6, the communication module 40 includes several kinds of communication interface circuits 401, a communication chip 402, and a signal converting unit 403.

Several kinds of communication interface circuits 401 are configured to communicate with the host computer 200.

In the present embodiment, the several kinds of communication interface circuits 401 include a USB interface circuit 4011, a WIFI interface circuit 4012, and a Bluetooth interface circuit 4013.

The communication chip 402 is electrically connected to each of the communication interface circuits 401.

In the present embodiment, the communication chip 402 comprises a radio frequency controller, a DDR random access memory, and an SPI flash memory. The radio frequency controller is respectively connected to the DDR random access memory, the SPI flash memory, the USB changeover switch 4032, the WIFI interface circuit 4012, and the Bluetooth interface circuit 4013. The USB interface circuit 4011 may be selected via the USB changeover switch 4032 for sending the diagnostic data, and the WIFI interface circuit 4012 or the Bluetooth interface circuit 4013 may be directly selected for sending the diagnostic data.

The signal converting unit 403 is electrically connected to the controller 50 and the communication chip 402 respectively, and is configured to convert the diagnostic data into communication data of a corresponding communication interface circuit such that the communication chip 402 selects a corresponding communication interface circuit and sends the communication data to the host computer 200.

The signal converting unit 403 includes a USB hub 4031 and a USB changeover switch 4032.

The USB hub 4031 is electrically connected to the controller 50, and is configured to forward the diagnostic data.

The USB changeover switch 4032 is electrically connected to the USB hub 4031, the communication chip 402, and the USB interface circuit 4011 respectively. When the controller 50 controls the USB changeover switch 4032 to work in a first switch state, the diagnostic data forwarded by the USB hub 4031 is transmitted to the communication chip 402 via the USB changeover switch 4032; when the controller 50 controls the USB changeover switch 4032 to work in a second switch state, the diagnostic data forwarded by the USB hub 4031 is transmitted to the USB interface circuit 4011 via the USB changeover switch 4032.

When the automobile diagnosis device 100 is powered on again, the current communication interface circuit is consistent with the communication interface circuit when power is down last time. If the communication interface circuit needs to be replaced, the communication chip 402 updates the communication signal according to a selection instruction of the host computer 200, and the communication signal is sent to a USB changeover switch 4032, a WIFI interface circuit 4012 or a Bluetooth interface circuit 4013 to select the USB changeover switch 4032, the WIFI interface circuit 4012 or the Bluetooth interface circuit 4013 as a new communication interface circuit.

The controller 50 is electrically connected to the automatic diagnosis circuit 10. Each communication bus circuit of the several diagnostic communication bus circuits 30, and the communication module 40 respectively, and is configured to select a target communication bus circuit according to the vehicle identification information, communicate with the automobile to be diagnosed via the target communication bus circuit so as to acquire diagnostic data of the automobile to be diagnosed, and send the diagnostic data to the host computer 200 via the communication module 40, wherein the target communication bus circuit includes one diagnostic communication bus circuit or the standard communication bus circuit.

The diagnostic data is fault code data, and the automobile maintenance personnel acquires fault information and determines a fault cause according to the fault code data displayed by the host computer 20.

In the present embodiment, the controller 50 comprises a single chip microcomputer and peripheral circuits thereof. The single chip microcomputer may adopt 51 series, Arduino series, STM32 series, etc.

In some embodiments, the controller 50 may also be a general purpose processor, a digital signal processor (DSP), an application specific integrated circuit (ASIC), a field programmable gate array (FPGA), an ARM (Acorn RISC Machine) or other programmable logic devices, discrete gate or transistor logic, discrete hardware components, or any combination of these parts; it can also be any traditional processor, controller, microcontroller or state machine; it may also be implemented as a combination of computing devices, e. g. a combination of a DSP and a microprocessor, a plurality of microprocessors, one or more microprocessors in conjunction with a DSP core, or any other such configuration.

In some embodiments, the automobile diagnosis device 100 further includes a power supply module and a key module (not shown in FIG. 6).

The power supply module is connected to the controller 50, and is configured to supply a power supply voltage to the controller 50. The power supply module comprises a battery connected to the controller 50 and a power supply management circuit respectively connected to the battery and the controller 50.

The key module is connected to the controller 50, and is configured to generate an operation instruction according to the user operation and send the operation instruction to the controller 50 so that the controller 50 executes a corresponding operation according to the operation instruction. The operation instruction comprises an acquisition instruction, a diagnostic mode instruction, etc. For example, when the operation instruction is an acquisition instruction, the controller 50 controls the automatic diagnosis circuit 10 to acquire vehicle identification information of an automobile to be diagnosed.

In the embodiment of the present application, the automobile diagnosis device 100 acquires vehicle identification information of an automobile to be diagnosed through the automatic diagnosis circuit. The controller selects a target communication bus circuit according to the vehicle identification information and communicates with the automobile to be diagnosed through the target communication bus circuit so as to acquire diagnostic data of the automobile to be diagnosed. The target communication bus circuit includes one diagnostic communication bus circuit or a standard communication bus circuit, and several diagnostic communication bus circuits include a 24V CAN bus circuit, an FDCAN bus circuit, a PLC bus circuit, at least one of the DoIP bus circuits, supporting several kinds of communication protocols of different automobile types. Therefore, the embodiment of the present application determines a communication protocol supported by an automobile to be diagnosed through vehicle identification information of the automobile to be diagnosed, and selects a corresponding target communication bus circuit according to the communication protocol such that the automobile diagnosis device 100 supports automobile diagnosis of different automobile types, thereby improving the universality of the automobile diagnosis device 100.

Figure 7:
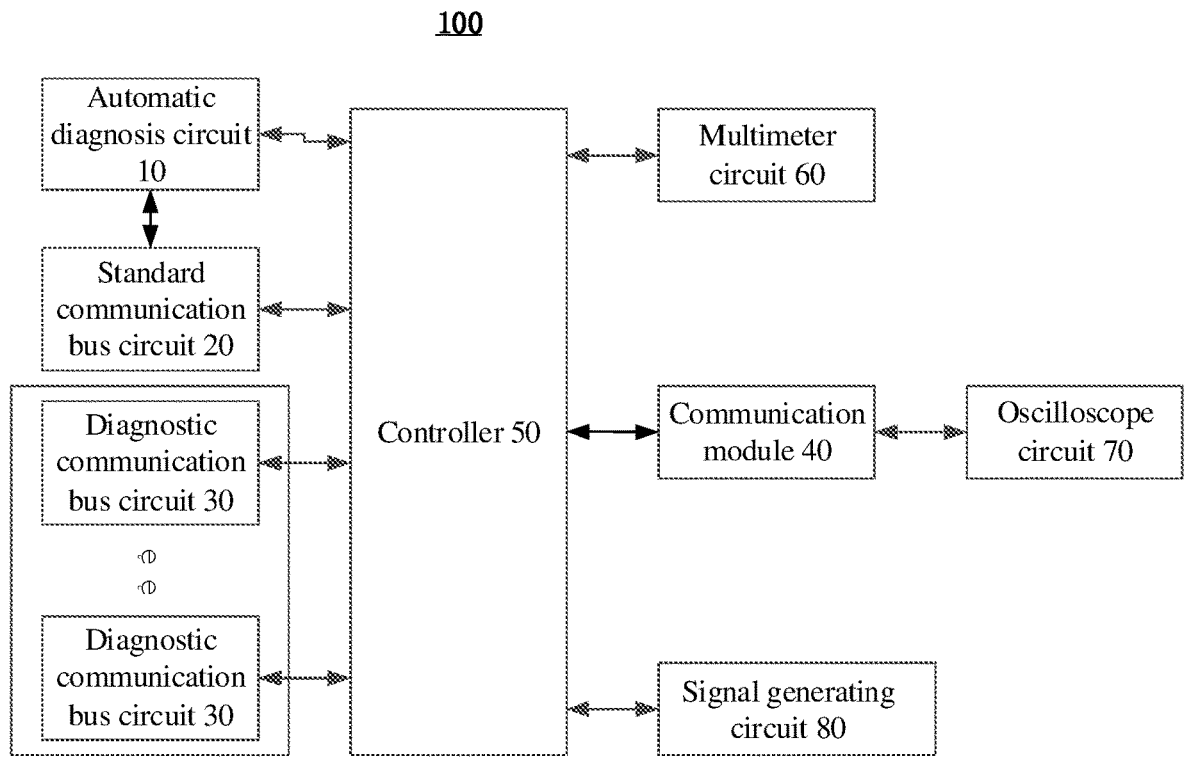
FIG. 7 is a schematic view showing a second structure of the automobile diagnosis device provided by another embodiment of the present application.

Referring to FIG. 7, a schematic view showing a second structure of the automobile diagnosis device 100 provided by another embodiment of the present application is shown. The automobile diagnosis device 100 further includes the components according to the above-described embodiment, and like reference is made to the above-described embodiments, which will not be described in detail. The difference is that the automobile diagnosis device 100 further includes a multimeter circuit 60, an oscilloscope circuit 70, and a signal generating circuit 80.

The multimeter circuit 60 is electrically connected to the controller 50, and is configured to send multimeter data to the controller 50 so that the controller 50 forwards the multimeter data to the host computer 200 via the communication module 40.

Figure 8:
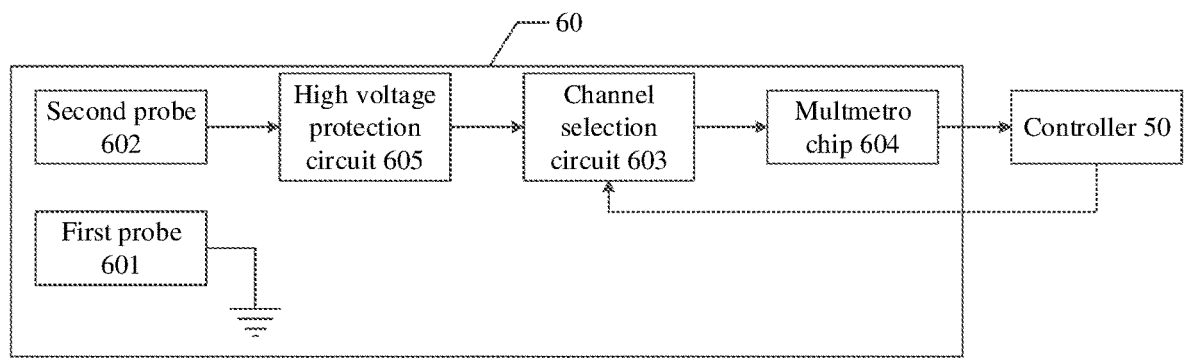
FIG. 8 is a schematic view showing the structure of a multimeter circuit provided by an embodiment of the present application.

Referring to FIG. 8, the multimeter circuit 60 includes a first probe 601, a second probe 602, a high-voltage protection circuit 605, a channel selection circuit 603, and a multmetro chip 604.

The first probe 601 is configured for grounding.

The first probe 601 is a negative electrode probe of the multimeter circuit 60, the second probe 602 is a positive electrode probe of the multimeter circuit 60, and a test end of the first probe 601 and the test end of the second probe 602 simultaneously act on a circuit under test. A closed loop is formed among the first probe 601, the second probe 602, and the circuit under test, and a current signal flows from the first probe 601 into the second probe 602 inside the automobile diagnosis device 100.

The high-voltage protection circuit 605 is electrically connected between the channel selection circuit 603 and the second probe 602 for performing high-voltage protection processing on the analog signal transmitted by the second probe 602.

In some embodiments, the high-voltage protection circuit 605 may be omitted.

The channel selection circuit 603 is electrically connected to the second probe 602 and the controller 50 respectively, and is configured to switch to a corresponding test channel for testing and generate a testing signal according to a channel selection instruction sent by the controller 50.

In the present embodiment, the test channel of the multimeter circuit 60 comprises a resistance test channel, an alternating current test channel, an alternating voltage test channel, a direct current test channel, a direct voltage test channel, a capacitance test channel, a diode test channel, a triode test channel, a buzzer test channel, etc. The corresponding testing signal comprises a resistance signal, an alternating current signal, an alternating voltage signal, a direct current signal, a direct voltage signal, a capacitance signal, a diode voltage drop signal, a triode voltage drop signal, a buzzer signal, etc. For example, when the channel selection circuit 603 switches to a direct current voltage test channel for testing according to a channel selection instruction sent by the controller 50, the connection end of the first probe 601 is controlled to switch to connect to the "COM" end, and the connection end of the second probe 602 is controlled to switch to connect to the "VΩ" end.

The multmetro chip 604 is electrically connected to the channel selection circuit 603 and the controller 50 respectively, and is configured to send the multimeter data to the controller 50 according to the testing signal.

The multmetro chip 604 sends the multimeter data to the controller 50 via a serial peripheral interface, namely, the corresponding multimeter data is serial data.

The oscilloscope circuit 70 is electrically connected to the communication module 40, and is configured to send oscilloscope data to the host computer 200 via the communication module 40.

It can be understood that the oscilloscope data is a waveform curve signal, and according to the waveform curve signal, signal parameters such as voltage, current, frequency, phase difference, and amplitude modulation of the analog signal can be measured.

Figure 9:
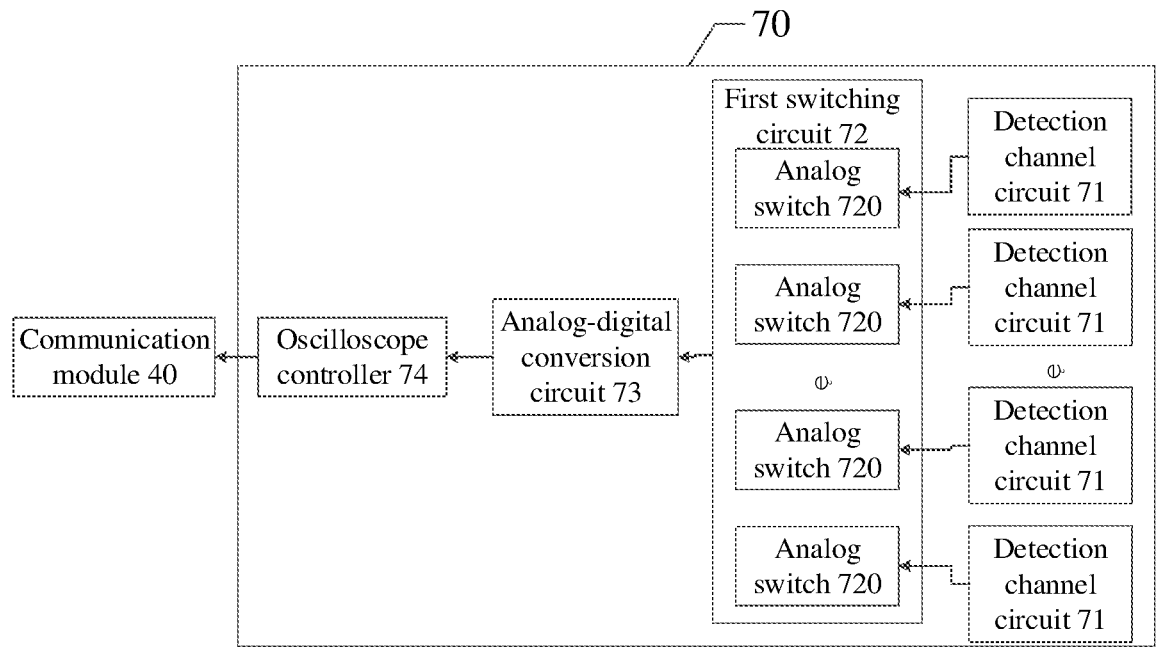
FIG. 9 is a schematic view showing the structure of an oscilloscope circuit provided by an embodiment of the present application.

Referring to FIG. 9, the oscilloscope circuit 70 includes several detection channel circuits 71, a first switching circuit 72, an analog-digital conversion circuit 73, and an oscilloscope controller 74.

Each of the detection channel circuits 71 is configured to detect and process an analog signal.

Figure 10:
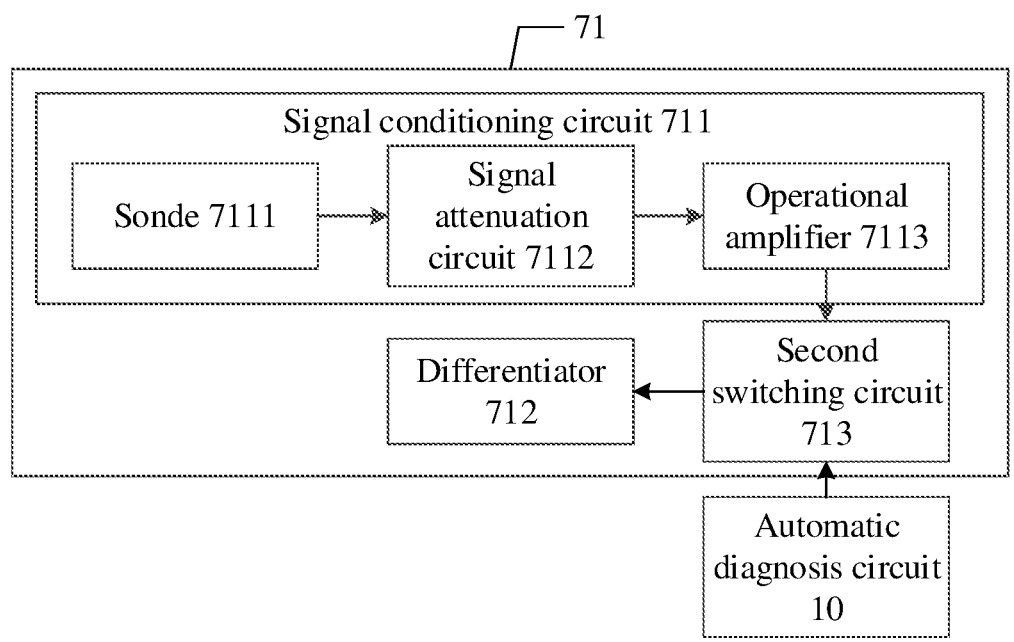
FIG. 10 is a schematic view showing the structure of a detection channel circuit provided by an embodiment of the present application.

Referring to FIG. 10, the detection channel circuit 71 includes a signal conditioning circuit 711 and a differentiator 712.

The signal conditioning circuit 711 is configured to detect the analog signal and perform signal conditioning on the analog signal.

Further, the signal conditioning circuit 711 includes a sonde 7111, a signal attenuation circuit 7112, and an operational amplifier 7113.

The sonde 7111 is configured to detect the analog signal. The signal attenuation circuit 7112 is electrically connected to the sonde 7111, and is configured to attenuate the analog signal. The operational amplifier 7113 is electrically connected to the signal attenuation circuit 7112, and is configured to for amplify the attenuated analog signal.

The differentiator 712 is electrically connected to the signal conditioning circuit 711 and one corresponding analog switch 720, and is configured to process the signal conditioned analog signal to obtain a differential signal.

In some embodiments, the detection channel circuit 71 further comprises a second switching circuit 713.

The second switching circuit 713 is electrically connected between the signal conditioning circuit 711 and the differentiator 712, and the second switching circuit 713 is also electrically connected to the automatic diagnosis circuit 10. When the second switching circuit 713 works in a first switch state under the control of the automatic diagnosis circuit 10, the signal-conditioned analog signal is transmitted to the differentiator 712 via the second switching circuit 713; when the second switching circuit 713 works in a second switch state under the control of the automatic diagnosis circuit 10, a communication waveform signal corresponding to the diagnostic data sent from the automatic diagnosis circuit 10 is transmitted to the differentiator 712 through the second switching circuit 713.

The communication waveform signal corresponding to the diagnostic data is converted into oscilloscope data through the second switching circuit 713, and is displayed on the host computer 200 in the form of a waveform curve signal. The display is more visual, facilitating data comparison with the multimeter data, and the oscilloscope data corresponding to the analog signal detected and processed by the detection channel circuit 71.

The first switching circuit 72 includes a plurality of analog switches 720, each of which is electrically connected to one corresponding detection channel circuit 71.

The analog-digital conversion circuit 73 is electrically connected to each of the analog switches 720 respectively. When a target analog switch works in a conducting state, a processed analog signal is input into the analog-digital conversion circuit 73 via the target analog switch, and the analog-digital conversion circuit 73 converts the processed analog signal into a digital signal.

The oscilloscope controller 74 is electrically connected to the communication module 40 and the analog-digital conversion circuit 73 respectively, and is configured to obtain oscilloscope data according to the digital signal, and send the oscilloscope data to the host computer 200 via the communication module 40.

Figure 11:
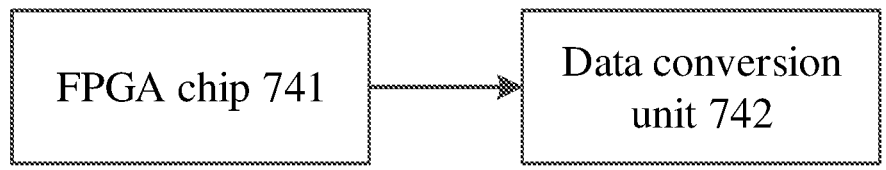
FIG. 11 is a schematic view showing the structure of an oscilloscope controller provided by an embodiment of the present application.

Referring to FIG. 11, the oscilloscope controller 74 includes an FPGA chip 741 and a data conversion unit 742.

The FPGA chip 741 is electrically connected to the analog-digital conversion circuit 73, and is configured to obtain oscilloscope communication data according to the digital signal. The data conversion unit 742 is electrically connected to the FPGA chip 741 and the communication module 40, and is configured to convert the oscilloscope communication data into oscilloscope data and send the oscilloscope data to the host computer 200 via the communication module 40.

In the present embodiment, the working state of the analog switch 720 is controlled via the FPGA chip 741, and an analog signal processed by one corresponding detection channel circuit 71 can be selectively output to the analog-digital conversion circuit 73. The oscilloscope communication data is parallel data, and is transmitted to the data conversion unit 742 via a parallel interface of the FPGA chip 741. The data conversion unit 742 converts the oscilloscope communication data into oscilloscope data, the oscilloscope data being USB type data. The oscilloscope data is sent to the USB hub 4031 via a USB interface of the data conversion unit 742.

The signal generating circuit 80 is electrically connected to the controller 50, and is configured to generate an analog waveform signal in response to a driving signal of the controller 50.

Figure 12:
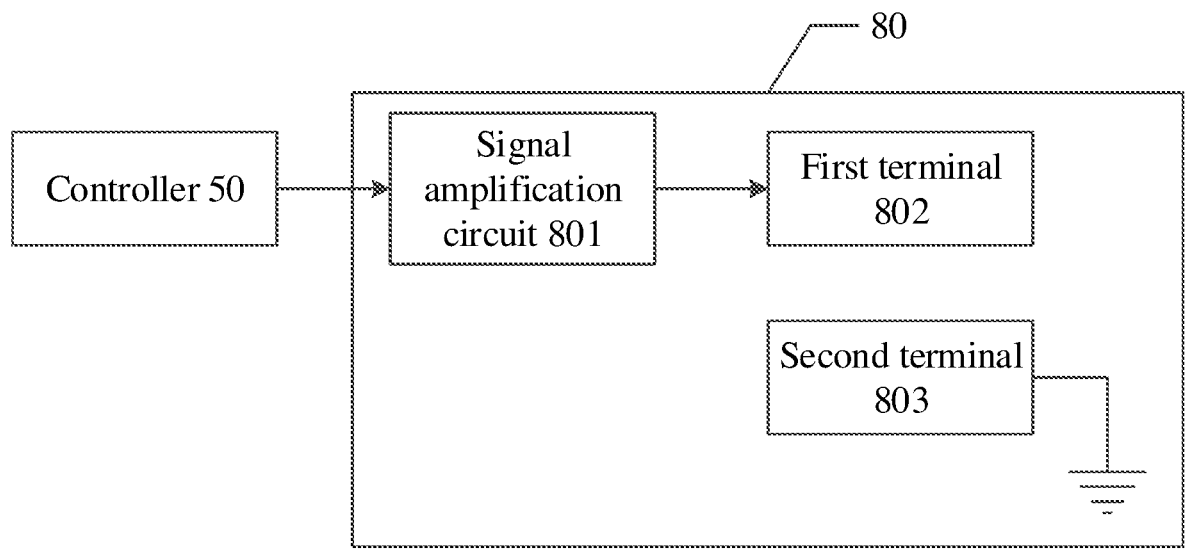
FIG. 12 is a schematic view showing the structure of a signal generating circuit provided by an embodiment of the present application.

Referring to FIG. 12, the signal generating circuit 80 includes a signal amplification circuit 801, a first terminal 802, and a second terminal 803.

The signal amplification circuit 801 is electrically connected to the controller 50, and is configured to amplify a driving signal sent by the controller 50 to obtain an analog waveform signal. The first terminal 802 is electrically connected to the signal amplification circuit 801, and is configured to transmit the analog waveform signal. The second terminal 803 is configured for grounding.

The signal generating circuit 80 is connected to a circuit under test, and the analog waveform signal amplified by the signal amplification circuit 801 acts on the circuit under test to trigger the operation of a target chip of the circuit under test so as to realize the fault detection in the case where the fault cause can be accurately determined only when the target chip of the circuit under test works.

The diagnostic working state of the automobile diagnosis device 100 includes a fault code diagnostic state, a fault code diagnostic state and an oscilloscope diagnostic state, a fault code diagnostic state and a multimeter diagnostic state, a fault code diagnostic state and a signal generator diagnostic state, a fault code diagnostic state, an oscilloscope diagnostic state and a multimeter diagnostic state, a fault code diagnostic state, an oscilloscope diagnostic state and a signal generator diagnostic state, and a fault code diagnostic state, a multimeter diagnostic state and a signal generator diagnostic state.

Specifically, when the diagnostic working state is adjusted to the fault code diagnostic state, the diagnostic data comprises fault code data; when the diagnostic working state is adjusted to the fault code diagnostic state and oscilloscope diagnostic state, the diagnostic data comprises fault code data and oscilloscope data; when the diagnostic working state is adjusted to the fault code diagnostic state and multimeter diagnostic state, the diagnostic data comprises fault code data and multimeter data; when the diagnostic working state is adjusted to the fault code diagnostic state and signal generator diagnostic state, the diagnostic data includes fault code data; when the diagnostic working state is adjusted to the fault code diagnostic state, oscilloscope diagnostic state, and multimeter diagnostic state, the diagnostic data comprises fault code data, oscilloscope data, and multimeter data; when the diagnostic working state is adjusted to the fault code diagnostic state, oscilloscope diagnostic state, and signal generator diagnostic state, the diagnostic data comprises fault code data and oscilloscope data; when the diagnostic working state is adjusted to the fault code diagnostic state, multimeter diagnostic state, and signal generator diagnostic state, the diagnostic data includes fault code data and multimeter data.

The automobile diagnosis device 100 sends the multimeter data to the controller 50 via the multimeter circuit 60 so that the controller 50 forwards the multimeter data to the host computer 200 via the communication module 40. The oscilloscope circuit 70 sends the oscilloscope data to the host computer 200 via the communication module 40, and the signal generating circuit 80 generates an analog waveform signal in response to the driving signal of the controller 50. Therefore, the automobile diagnosis device 100 integrates the multimeter circuit 60, the oscilloscope circuit 70, and the signal generating circuit 80, thereby avoiding the problem that the specific fault cause can not be accurately determined only by using fault code data, and improving the adaptability of the automobile diagnosis device 100.

Figure 13:
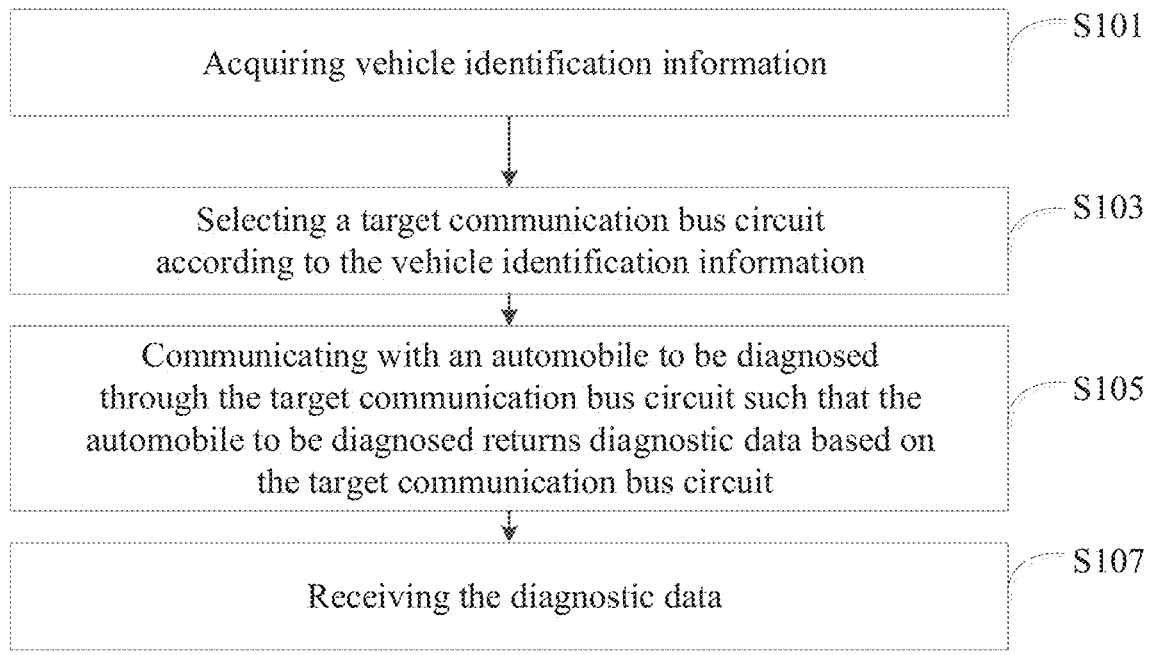
FIG. 13 is a schematic process diagram of an automobile diagnosis method provided by an embodiment of the present application.

Referring to FIG. 13, a schematic process diagram of an automobile diagnosis method provided by an embodiment of the present application is shown. The automobile diagnosis method is applied to the automobile diagnosis device 100 as described in any of the above embodiments, the method comprising:

S101: acquiring vehicle identification information;
S103: selecting a target communication bus circuit according to the vehicle identification information;
S105: communicating with an automobile to be diagnosed through the target communication bus circuit such that the automobile to be diagnosed returns diagnostic data based on the target communication bus circuit; and
S107: receiving the diagnostic data.

It should be noted that the above-mentioned method embodiment and the device embodiment of the present application are based on the same concept. For details, please refer to the descriptions in the device embodiment of the present application, which will not be repeated here.

The embodiment of the present application provides an automobile diagnosis method: acquiring vehicle identification information, selecting a target communication bus circuit according to the vehicle identification information, and communicating with an automobile to be diagnosed through the target communication bus circuit such that the automobile to be diagnosed returns diagnostic data based on the target communication bus circuit. Therefore, according to the embodiment of the present application, a communication protocol supported by the automobile to be diagnosed is determined through the vehicle identification information about the automobile to be diagnosed, and a corresponding target communication bus circuit is selected according to the communication protocol. The target communication bus circuit comprises one diagnostic communication bus circuit or a standard communication bus circuit, and the diagnostic communication bus circuit comprises at least one of a 24V CAN bus circuit, an FDCAN bus circuit, a PLC bus circuit, and a DoIP bus circuit so that the automobile diagnosis device 100 supports automobile diagnostics of different automobile types, thereby improving the universality of the automobile diagnosis device 100.

Finally, it should be noted that: the above embodiments are merely illustrative of the technical solutions of the present application, rather than limiting it; combinations of technical features in the above embodiments or in different embodiments are also possible under the idea of the present application, and the steps can be implemented in any order; there are many other variations of the different aspects of the present application as described above, which are not provided in detail for the sake of brevity; although the present application has been described in detail with reference to the foregoing embodiments, those of ordinary skills in the art will appreciate that the technical solutions disclosed in the above-mentioned embodiments can still be modified, or some of the technical features thereof can be replaced by equivalents; such modifications or replacements do not depart the essence of the corresponding technical solution from the scope of the technical solutions of embodiments of the present application.

What is claimed is:

1. An automobile diagnosis device, comprising:
   an automatic diagnosis circuit configured to acquire vehicle identification information of an automobile to be diagnosed;
   a standard communication bus circuit electrically connected to the automatic diagnosis circuit;
   several diagnostic communication bus circuits comprising at least one of a 24V CAN bus circuit, an FDCAN bus circuit, a PLC bus circuit, and a DoIP bus circuit, the several diagnostic communication bus circuits supporting communication protocols of several kinds of different automobile types;
   a communication module; and
   a controller electrically connected to the automatic diagnosis circuit, the standard communication bus circuit, each of the several diagnostic communication bus circuits, and the communication module respectively, the controller configured to select a target communication bus circuit according to the vehicle identification information, communicate with the automobile to be diagnosed via the target communication bus circuit so as to acquire diagnostic data of the automobile to be diagnosed, and send the diagnostic data to a host computer via the communication module, wherein the target communication bus circuit comprises one diagnostic communication bus circuit or the standard communication bus circuit;
   wherein the 24V CAN bus circuit comprises:
   a CAN receiving circuit electrically connected to the controller, and configured to receive data sent by the controller according to vehicle identification information and outputting a differential signal; and
   a CAN transmission circuit electrically connected to the CAN receiving circuit and the controller respectively, and configured to enable the controller to communicate with the automobile to be diagnosed according to the differential signal, and forward the diagnostic data to the controller;
   wherein the CAN receiving circuit comprises:
   a first buffer circuit electrically connected to the controller, and configured to buffer the vehicle identification information;
   a first level conversion circuit electrically connected to the first buffer circuit, and configured to convert buffered vehicle identification information into a first level signal;
   a second buffer circuit electrically connected to the first buffer circuit, and configured to receive the vehicle identification information from the first buffer circuit, and secondly buffer the vehicle identification information; and
   a second level conversion circuit electrically connected to the second buffer circuit, and configured to convert the vehicle identification information after secondary buffering into a second level signal, wherein the first level signal and the second level signal constitute the differential signal and are output to the CAN transmission circuit.

2. The automobile diagnosis device according to claim 1, wherein the 24V CAN bus circuit is electrically connected to the controller.

3. The automobile diagnosis device according to claim 1, wherein the FDCAN bus circuit is electrically connected to the controller.

4. The automobile diagnosis device according to claim 1, wherein the PLC bus circuit is electrically connected to the controller.

5. The automobile diagnosis device according to claim 1, wherein the DoIP bus circuit is electrically connected to the controller.

6. The automobile diagnosis device according to claim 5, wherein the DoIP bus circuit comprises:
   an Ethernet hub respectively electrically connected to the controller and the communication module; and
   a network transformer electrically connected to the Ethernet hub, and configured to transform the diagnostic data and send the diagnostic data to the Ethernet hub.

7. The automobile diagnosis device according to claim 6, wherein the DoIP bus circuit further comprises an RJ45 network port electrically connected to the Ethernet hub.

8. The automobile diagnosis device according to claim 1, wherein the communication module comprises:
   several kinds of communication interface circuits configured to communicate with the host computer;
   a communication chip electrically connected to each of the communication interface circuits; and
   a signal converting unit electrically connected to the controller and the communication chip respectively, the signal converting unit configured to convert the diagnostic data into communication data corresponding to the communication interface circuit so that the communication chip selects a corresponding communication interface circuit and sends the communication data to the host computer.

9. The automobile diagnosis device according to claim 8, wherein the several kinds of communication interface circuits comprise a USB interface circuit, a WIFI interface circuit, and an interface circuit.

10. The automobile diagnosis device according to claim 9, wherein the signal converting unit comprises:
    a USB hub electrically connected to the controller, and configured to forward the diagnostic data; and
    a USB changeover switch electrically connected to the USB hub, the communication chip, and the USB interface circuit respectively, wherein:
    when the controller controls the USB changeover switch to work in a first switch state, the diagnostic data forwarded by the USB hub is transmitted to the communication chip via the USB changeover switch;
    when the controller controls the USB changeover switch to work in a second switch state, the diagnostic data forwarded by the USB hub is transmitted to the USB interface circuit via the USB changeover switch.

11. An automobile diagnosis method, being applied to the automobile diagnosis device according to claim 1, wherein the method comprises:
    acquiring vehicle identification information;
    selecting a target communication bus circuit according to the vehicle identification information;
    communicating with an automobile to be diagnosed through the target communication bus circuit such that the automobile to be diagnosed returns diagnostic data based on the target communication bus circuit; and receiving the diagnostic data.

12. An automobile diagnosis system, comprising:
an automobile diagnosis device comprising: an automatic diagnosis circuit, a standard communication bus circuit, several diagnostic communication bus circuits, a communication module, and a controller; and
a host computer communicatively connected to the automobile diagnosis device, and configured to display diagnostic data sent by the automobile diagnosis device;
wherein the automatic diagnosis circuit is configured to acquire vehicle identification information of an automobile to be diagnosed;
the standard communication bus circuit is electrically connected to the automatic diagnosis circuit;
the several diagnostic communication bus circuits comprise at least one of a 24V CAN bus circuit, an FDCAN bus circuit, a PLC bus circuit, and a DoIP bus circuit, the several diagnostic communication bus circuits supporting communication protocols of several kinds of different automobile types;
the controller is electrically connected to the automatic diagnosis circuit, the standard communication bus circuit, each of the several diagnostic communication bus circuits, and the communication module respectively;
the controller is configured to select a target communication bus circuit according to the vehicle identification information, communicate with the automobile to be diagnosed via the target communication bus circuit so as to acquire diagnostic data of the automobile to be diagnosed, and send the diagnostic data to the host computer via the communication module, wherein the target communication bus circuit comprises one diagnostic communication bus circuit or the standard communication bus circuit;
wherein the 24V CAN bus circuit is electrically connected to the controller, and the 24V CAN bus circuit comprises:
a CAN receiving circuit electrically connected to the controller, and configured to receive data sent by the controller according to vehicle identification information and outputting a differential signal; and
a CAN transmission circuit electrically connected to the CAN receiving circuit and the controller respectively, and configured to enable the controller to communicate with the automobile to be diagnosed according to the differential signal, and forward the diagnostic data to the controller;
wherein the CAN receiving circuit comprises:
a first buffer circuit electrically connected to the controller, and configured to buffer the vehicle identification information;
a first level conversion circuit electrically connected to the first buffer circuit, and configured to convert buffered vehicle identification information into a first level signal;
a second buffer circuit electrically connected to the first buffer circuit, and configured to secondly buffering the vehicle identification information; and
a second level conversion circuit electrically connected to the second buffer circuit, and configured to convert the vehicle identification information after secondary buffering into a second level signal, wherein the first level signal and the second level signal constitute the differential signal and are output to the CAN transmission circuit.

13. The automobile diagnosis system according to claim 12, wherein the FDCAN bus circuit is electrically connected to the controller, the PLC bus circuit is electrically connected to the controller, and the DoIP bus circuit is electrically connected to the controller.

14. The automobile diagnosis system according to claim 13, wherein the DoIP bus circuit comprises:
an Ethernet hub respectively electrically connected to the controller and the communication module; and
a network transformer electrically connected to the Ethernet hub, and configured to transform the diagnostic data and send the diagnostic data to the Ethernet hub.

15. The automobile diagnosis system according to claim 12, wherein the communication module comprises:
several kinds of communication interface circuits configured to communicate with the host computer;
a communication chip electrically connected to each of the communication interface circuits; and
a signal converting unit electrically connected to the controller and the communication chip respectively, the signal converting unit configured to convert the diagnostic data into communication data corresponding to the communication interface circuit so that the communication chip selects a corresponding communication interface circuit and sends the communication data to the host computer.

16. The automobile diagnosis system according to claim 15, wherein the signal converting unit comprises:
a USB hub electrically connected to the controller, and configured to forward the diagnostic data; and
a USB changeover switch electrically connected to the USB hub, the communication chip, and a USB interface circuit respectively, wherein:
when the controller controls the USB changeover switch to work in a first switch state, the diagnostic data forwarded by the USB hub is transmitted to the communication chip via the USB changeover switch;
when the controller controls the USB changeover switch to work in a second switch state, the diagnostic data forwarded by the USB hub is transmitted to the USB interface circuit via the USB changeover switch.

* * * * *